US007180965B2

(12) United States Patent
Eilts et al.

(10) Patent No.: US 7,180,965 B2
(45) Date of Patent: Feb. 20, 2007

(54) PHASE ESTIMATION AND COMPENSATION IN ORTHOGONAL FREQUENCY DIVISION MULTIPLEX (OFDM) SYSTEMS

(75) Inventors: Henry Stephen Eilts, Plano, TX (US); Srinath Hosur, Plano, TX (US); David Patrick Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 790 days.

(21) Appl. No.: 10/172,557

(22) Filed: Jun. 14, 2002

(65) Prior Publication Data
US 2003/0108127 A1 Jun. 12, 2003

Related U.S. Application Data

(60) Provisional application No. 60/360,654, filed on Mar. 1, 2002, provisional application No. 60/339,329, filed on Dec. 12, 2001.

(51) Int. Cl.
H03D 1/00 (2006.01)
H04B 3/46 (2006.01)
H04L 27/08 (2006.01)
(52) U.S. Cl. .................... 375/340; 375/226; 375/345
(58) Field of Classification Search ................ 375/259, 375/260, 285, 346–47, 349–50, 224, 227, 375/228, 340, 316, 229–232, 354, 378, 371, 375/226, 344, 345, 331, 233, 347, 350; 370/241, 370/252, 281, 295, 208, 210; 342/378; 455/136, 455/560–61, 75, 313, 316
See application file for complete search history.

(56) References Cited

U.S. PATENT DOCUMENTS

| 6,347,126 B1 * | 2/2002 | Nagayasu et al. .......... 375/344 |
| 7,020,222 B2 * | 3/2006 | Magee ....................... 375/340 |
| 2002/0057753 A1 * | 5/2002 | Sanchez et al. ............ 375/346 |
| 2003/0081695 A1 * | 5/2003 | Eilts et al. .................. 375/316 |
| 2003/0086508 A1 | 5/2003 | Magee |

FOREIGN PATENT DOCUMENTS

EP 0959568 A1 11/1999

OTHER PUBLICATIONS

Robertson, Patrick et al; Analysis of the Effects of Phase-Noise in Orthogonal Frequency Division Multiplex (OFDM) System.

* cited by examiner

*Primary Examiner*—Mohammed Ghayour
*Assistant Examiner*—Sophia Vlahos
(74) *Attorney, Agent, or Firm*—Steven A. Shaw; W. James Brady; Frederick J. Telecky, Jr.

(57) ABSTRACT

Methods are presented for phase estimation and compensation in Orthogonal Frequency Division Multiplex systems. The methods include the step of extracting training tones from a received digitized data burst. Some of the methods further include the steps of determining a channel impulse response based on the extracted tones; estimating phase shift caused by common phase noise; correcting the impulse response and performing a Fast Fourier transform to provide a channel estimate. Some of the methods include estimating the phase shift caused by common phase noise before an average impulse response is updated with the current impulse impulse. Some of the methods include frequency shifting the spectrum of the channel impulse response and providing partial estimates.

14 Claims, 8 Drawing Sheets

PHASE ESTIMATION AND COMPENSATION IN ORTHOGONAL FREQUENCY DIVISION MULTIPLEX (OFDM) SYSTEMS

This application claims priority under 35 USC § 119(e)(1) of provisional application No. 60/339,329, filed Dec. 12, 2001. This application claims priority under 35 USC § 119(e)(1) of provisional application No. 60/360,654, filed Mar. 1, 2002.

FIELD OF INVENTION

This invention relates to Orthogonal Frequency Division Multiplex (OFDM) systems and more particularly to phase estimation and compensation.

BACKGROUND OF INVENTION

Orthogonal Frequency Division Multiplex (OFDM) is used for the air interface for the IEEE 802.11a, ETSI Hiperian-II, terrestrial digital video broadcast (DVB-T), and Broadband Wireless Internet Forum (BWIF) standards. It is also used in wireline transmission, notably Asynchronous Digital Subscriber Lines (ADSL). The OFDM technique sends many carriers (sometimes thousands of carriers) in parallel on adjacent frequencies within a frequency band. The frequencies are variously called frequency "bins", tones, or subbands. Tones is the term used in the following description.

The OFDM technique relies on the orthogonality properties of the fast Fourier transform (FFT) and the inverse fast Fourier transform (IFFT) to eliminate interference between the carriers. The FFT can be thought of as a bank of filters, with each filter having the identical frequency response as the other filters, but centered on different center frequencies. The response of each filter in the filter bank is a maximum at the center frequency of the filter, but zero at the center frequencies of the other filters. Thus, if the carriers are centered on the center frequencies of the filters, intercarrier interference is eliminated. If a carrier frequency is not perfectly centered, then its frequency is not at the zero response points of the FFT filters, and some of the carrier energy appears in the FFT outputs at the other frequencies. In FFT nomenclature, this is called leakage. Leakage is the main source of intercarrier interference in OFDM systems.

At the transmitter, the precise setting of the carrier frequencies is performed by an IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, unconverted to a radio frequency, amplified, and transmitted.

At the receiver, the reverse process is performed. The received signal is amplified, downconverted to a band suitable for analog to digital conversion, digitized, and ultimately processed by a FFT to recover the carriers. The multiple carriers are then demodulated in multiple constellation decoders (one for each carrier), recovering the original data.

Since an IFFT is used to combine the carriers at the transmitter and a corresponding FFT is used to separate the carriers at the receiver, the process has potentially zero intercarrier interference (ICI). However, practicalities such as synchronization errors, frequency tracking errors, and phase noise introduce intercarrier interference by shifting or jittering the carriers from the center frequencies of the filters and allowing some leakage. Some of these effects can be compensated, and some cannot. This patent is concerned with compensation methods for phase noise degradations.

In wireless transmissions, the signal can be reflected or scattered from buildings, vehicles, trees, vegetation, and terrain features. Multiple copies of the signal, each with a different time delay that depends upon the path traversed, are summed at the receive antenna, This phenomenon is called multipath transmission, or more simply multipath. Multipath causes fading and attenuation in the frequency band, which if uncompensated would cause unacceptably large numbers of errors in the decoding process.

To avoid this, carriers with known amplitude and phase are transmitted for the purpose of measuring the wireless transmission channel. These carriers are known as training tones or pilot tones. In some systems, they are transmitted in a separate burst composed entirely of training tones. In other systems, such as the BWIF standardized system to be described herein, they are interspersed among the data carriers (data tones.) In either case, since the training tones are known apriori, the response of the wireless channel at the training tone frequencies is easily determined. Once this is done, the channel responses at the data tone frequencies can be interpolated from the known responses at the training tone frequencies. This process is called channel estimation. The measured and interpolated channel responses, known as channel estimates, are used in the decoding process to minimize decoding errors.

Phase noise is introduced into the signals by phase noise in the local oscillators used to upconvert and downconvert the signal, as well as by timing jitter of the sampling in the digital to analog and analog to digital converters at the transmitter and receiver, respectively. Each carrier, which would have a line spectrum otherwise, now has a phase noise spectrum associated with it.

For OFDM systems, phase noise can be classified into two categories—common phase noise and foreign phase noise. Common phase noise is so named because it affects all carriers equally. It is generated by the local oscillators' phase noises and the data converters' timing errors, which modulate each carrier equally. This causes a phase rotation on each and every carrier that is equal in sign and amount. Foreign phase noise, on the other hand, is caused by the leakage of the phase noise spectra of the other carriers ("foreign" carriers) into the filter response of a given carrier. Foreign phase noise appears as random noise from carrier to carrier. The effects of phase noise on OFDM systems are analyzed in the article "Influence of RF Oscillators on an OFDM Signal", by Claus Muschallik. This was published in the IEEE Transactions on Consumer Electronics, Vol. 41, No. 3, August 1995, pp. 592–602.

FIG. 1 illustrates a functional block diagram of a wireless receiver system 10 employing a channel estimator 20. A data signal or burst is received by an antenna 14, which picks up the data signal and couples the data signal to front end processing 12. The data signal or burst can include training and calibration information. The processing 12 amplifies the data signal, converts the data signal to an IF frequency and filters the data signal to remove signal outside the desired frequency band. The front end processing 12 is coupled to one or more analog-to-digital converters 16 that sample the data signal and provide digitized signal output. The digitized signals of the one or more analog to digital converters are provided to a digital preprocessor 18. The digital preprocessor then performs a FFT on the digitized signal. The FFT on the digitized signal converts the signal from the time domain to the frequency domain so that the frequencies or tones carrying the data can be provided. The frequencies and tones can then be demodulated or decoded. The demodulation of the tones requires information relating to the wireless channel magnitude and phase at each tone. The effects of the dispersion caused by the channel needs to be compensated prior to decoding of the signal, so that decoding errors can be minimized. A channel estimator 20 is provided to determine the amount of phase rotation and magnitude perturbation applied to the tones by the channel. Since the training tones are transmitted with known magnitude and phase, the channel response at the training tones is easily determined. The known channel response at the training tones is then interpolated in the frequency domain to determine the channel response at the data tones. A cyclic interpolation procedure can be employed. The channel estimate is then provided to the data demodulator 22 for demodulation of the digital data signal. The demodulated data signal is then transmitted to a data postprocessing block 24 for further signal processing. The data post processing performs error correction utilizing the information from the data demodulator 22. The channel estimator 20 extracts the training tones from the number of tones in the data signal or data burst and performs several signal processing steps on the training tones. After correcting for any transmitted magnitude and phase differences, the channel estimator 20 performs an IFFT on the training tones to provide a channel impulse response. The channel impulse response will eventually be zero padded and have a FFT performed on it to obtain channel estimate values at frequencies between the training tone frequencies.

The BWIF channel estimation method is shown in FIG. 2. The procedure starts by providing a set of frequency samples of training tones H(k) and at block 31 extracting the training (also called pilot) tones $H_{TT}(k)$ from the set of all tones H. Note that N denotes the number of all tones, and $N_{TT}$ denotes the number of training tones. Modulation on the training tones is removed at block 32, and the edge tone, which is transmitted at reduced amplitude, is re-scaled to proper amplitude at step 33. In block 34, an inverse fast Fourier transform (IFFT) on the training tones is performed to obtain the channel impulse response. The impulse response is scaled to unity in block 35. In block 36 the impulse response is averaged with previous bursts to reduce noise. The average impulse response is then zero padded (block 37) and an N-point FFT is performed at block 38 to produce the final channel estimate. Note that it is possible to omit the averager at block 36 (or equivalently, set α equal to zero in the averaging equation in block 36).

Common phase noise causes all of the tones (H and $H_{TT}$) to be phase shifted by a common amount. Therefore, every term of the impulse response is also phase shifted by the same amount. This phase shift is a zero mean random variable and changes for each burst. The problem occurs at block 36 of FIG. 1, when multiple impulse responses are averaged to produce an average impulse response. The averaging is intended to reduce the noise in the final estimate. However, it also averages the common phase noise to near zero. This can be a problem in that the data tones will have the common phase shift, but the channel estimate produced from the average impulse response will not. This results in increased error rates in the demodulation of the data. For the standard BWIF processing, this is only a problem if the averager is enabled (α≠0). If the averager is not enabled, the common phase noise is present identically in both the channel estimate and the data, and is thus compensated in the standard demodulation process.

In addition to this problem, Texas Instruments has developed (see Appendix A; TI-32977, Ser. No. 10/001,986 filed Oct. 31, 2001) a computationally more efficient method of obtaining channel estimates for the BWIF system. This application is incorporated herein by reference. The TI method estimates 1/K of the tones (typically ¼ of the tones) at each burst, and uses K bursts (typically 4 bursts) to estimate the tones. At each burst, a channel estimate for all tones is obtained by using the N/K tone estimates computed on the current burst, and the (K−1)*N/K tone estimates from the (K−1) previous bursts.

Phase noise causes two problems here. First, any impulse response averaging will average the phase noise to zero, just as in the original BWIF method. Since the data will be phase shifted (by the common phase noise), but the channel estimate is not, there is an error introduced in the demodulation of the data, which causes increased error rates. Secondly, since the complete channel estimate is formed over K bursts, each N/K set of estimates was obtained at a different phase state (from the common phase noise). This makes the channel estimates obtained with this method noisy.

SUMMARY OF INVENTION

In accordance with one embodiment of the present invention a method for estimating the burst-to-burst phase shift and adjusting the channel estimates to compensate for it is provided by first obtaining an estimate of the phase shift caused by the common phase noise and second by either phase correcting the impulse noise or tones in the channel response.

The actual implementation procedure of these steps is specific to the channel estimation procedure. One embodiment is BWIF standard channel estimation with impulse response averaging.

A second is a Texas Instruments Inc. estimation procedure with impulse response averaging.

A third is the Texas Instruments Inc. channel estimation without impulse response averaging.

A fourth embodiment is an alternative implementation for the BWIF standard to estimate the phase angle based on the value of $h_{avg}$ before it is updated with the current impulse response.

A fifth embodiment is an alternative embodiment using the TI estimation method with impulse response averaging incorporating the phase estimation method of the fourth embodiment to estimate the phase angle based on the value of $h_{avg}$ before it is updated with the current impulse response.

DESCRIPTION OF PREFERRED EMBODIMENT OF THE PRESENT INVENTION

Figure 1:
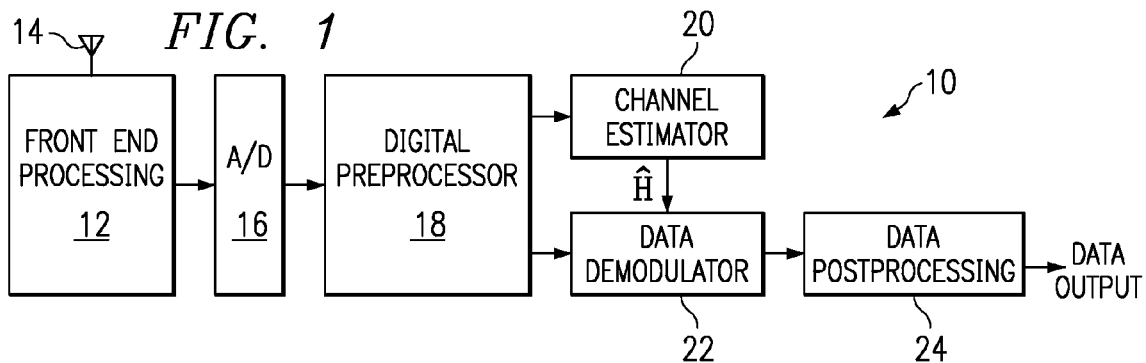
FIG. 1 illustrates a functional block diagram of a wireless receiver employing a channel estimator.

This patent addresses means to compensate for common phase noise in BWIF standardized and similar OFDM systems. These systems have training tones interspersed among the data tones on each burst. There are two broad categories to consider. In these systems, the channel estimates can be obtained either from the training tones of the current burst exclusively (Case 1), or from an average of the training tones in the current and previous bursts (Case 2). On any given burst, common phase noise has affected the tones by introducing a phase rotation, common to all the tones. In Case 1, since the channel estimates are obtained from these phase shifted training tones, the channel estimates are similarly phase shifted, and the phase shift on the data is automatically compensated by the phase shift on the channel estimates in the decoding process.

In Case 2, if the channel estimates are obtained from an average of training tones over several bursts, then the averaging process has likely reduced the phase rotation on the channel estimates. The data tones however, have the phase shift of the current burst. Since the channel estimates and the data do not match in phase shift, some benefit can be obtained by a compensation procedure. In the procedure to be described herein, the difference in phase shift between channel estimates and the current burst is first estimated. Then, the estimate is used to rotate the channel estimate to the phase state of the current burst prior to the data decoding operation.

In addition to these cases, Texas Instruments (TI) has developed several channel estimation procedures that are computationally more economical than the standard BWIF estimation procedure. These are described in application Ser. No. 10/001,986 filed Oct. 31 2001 (TI-32977) entitled "A Computationally Efficient System and Method for Channel Estimation." This application is incorporated herein by reference. These economical procedures obtain channel estimates for different tones on successive bursts. Thus, the phase rotation introduced into the channel estimates by the common phase noise is different for the different tones, depending upon which burst the estimate was obtained. Phase noise compensation procedures for these procedures are also described herein.

The solution is a two step process. First, we obtain an estimate of the difference between the common phase noise induced phase shifts of channel estimates and the phase shifts of the current burst. Second, we phase align either the impulse response or the tones in the channel estimate with the phase of the current burst. The actual implementation of these steps is specific to the channel estimation procedure. There are five embodiments.

1. The BWIF standard channel estimation method with impulse response averaging.

2. The TI channel estimation with impulse response averaging.

3. The TI channel estimation without impulse response averaging. These will each be discussed below.

4. An alternative implementation for the BWIF standard including an alternative implementation of phase noise estimation and compensation.

5. The TI channel estimation method with impulse response averaging incorporating the alternate phase estimation and compensation.

1. Phase Noise Compensation for the BWIF Standard Channel Estimation Procedure with Impulse Response Averaging FIG. 3 illustrates the first embodiment of the present invention. The procedure starts as done previously in FIG. 2 by providing a set of frequency samples of training tones H(k) and at block 41 extracting the training (also called pilot) tones $H_{TT}(k)$ from the set of all tones H. The modulation on the training tones is removed at block 42, and the edge tone, which is transmitted at reduced amplitude, is re-scaled to proper amplitude at step 43. In block 44, an inverse fast Fourier transform (IFFT) on the training tones is performed to obtain the channel impulse response. The impulse response is scaled to unity in block 45. In block 46 the impulse response is averaged with previous bursts to reduce noise.

Figure 2:
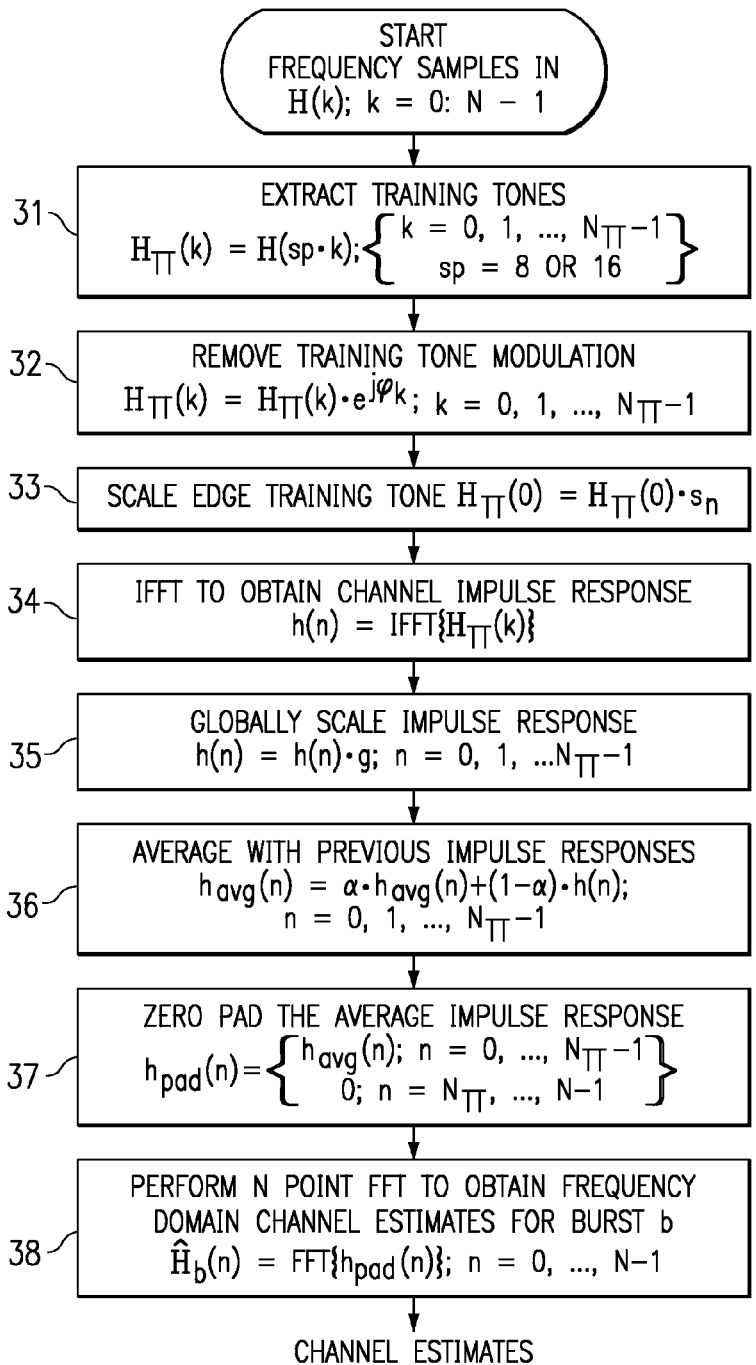
FIG. 2 illustrates BWIF channel estimation procedure according to the prior art.
Figure 3:
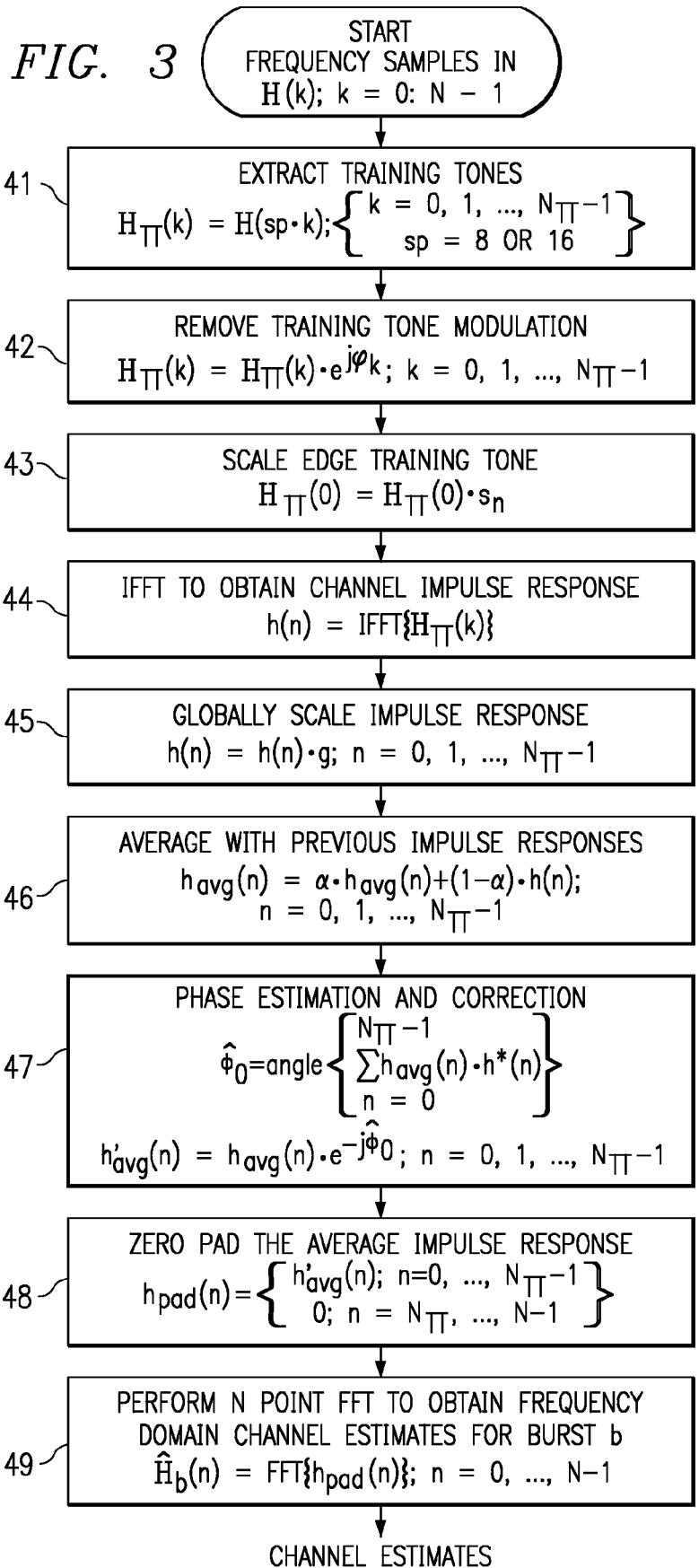
FIG. 3 illustrates BWIF channel estimation procedure incorporating phase noise estimation and compensation according to one embodiment of the present invention.

The modifications to the BWIF standard channel estimation procedure of FIG. 2 are shown in FIG. 3 in bold outline. Here, all of the current impulse response samples h(n) have been phase shifted due to the phase noise, but the average impulse response $h_{avg}$ (n) has near zero phase shift. To estimate the difference in phase between the current impulse response and the average impulse response, the following computation is performed in block 47:

$$\hat{\Phi}_0 = \text{angle}\left\{\sum_n h_{avg}(n) \cdot h^*(n)\right\}. \qquad (1)$$

where $\hat{\Phi}_0$ is the estimate of the phase difference between the average impulse response and the current impulse response. Since the data is phase-aligned with the current impulse response, but the channel estimate is obtained from the average, the average impulse response is then phase corrected by $-\hat{\Phi}_0$ to phase-align it with the current data. This is accomplished with the following computation:

$$h'_{avg}(n) = h_{avg}(n) \cdot e^{-j\hat{\Phi}_0}; \ n=0,1,\ldots,N_{TT}-1 \qquad (2)$$

Here, $h'_{avg}$ is the phase corrected average. The average impulse response is then zero padded (block 48) using $h'_{avg}$ and an N-point FFT is performed at block 49 to produce the final channel estimate.

2. Phase Noise Compensation for the TI Channel Estimation Procedure with Impulse Response Averaging.

Figure 4:
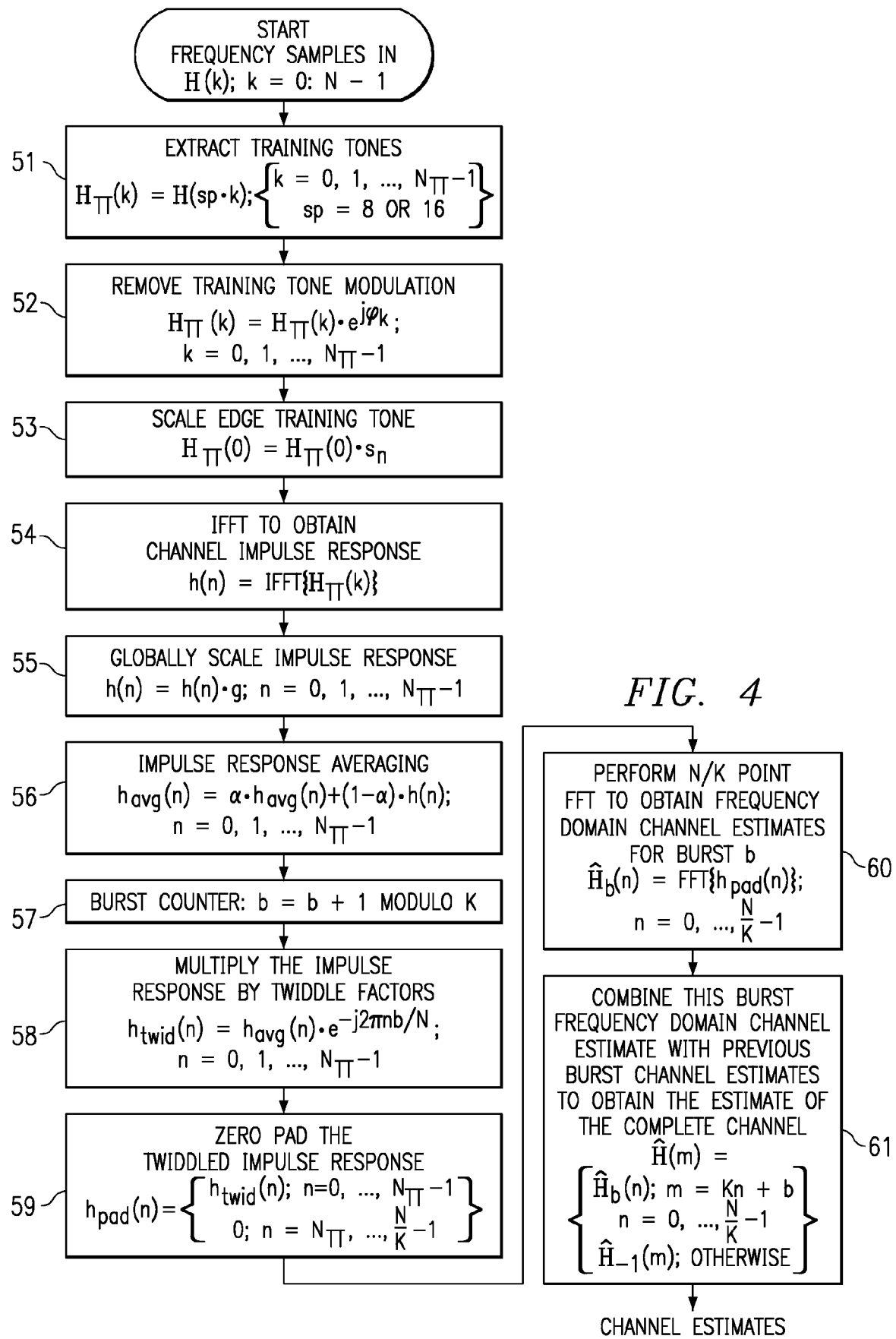
FIG. 4 illustrates an embodiment of the Texas Instruments Channel Estimation Procedure with impulse response averaging described in Ser. No. 10/001,986 filed Oct. 31, 2001.

The TI channel estimation procedure with impulse response averaging is shown in FIG. 4. Blocks 51 through 56 are identical to those in the standard BWIF channel estimation method (Blocks 31–36) shown in FIG. 2. However, in the remaining blocks, the processing is altered so that only 1/K of the tones are estimated at any one burst. The channel estimate for a burst is composed of the N/K tones estimated currently and (K−1)N/K tones estimated at previous bursts. Block 57 is a burst counter, modulo K. The value of b is a burst count index used for later computations. At block 58, the average impulse response is frequency shifted or "twiddled" by multiplication of $h_{avg}$ (n) with $e^{-j2\pi nb/N}$. At block 59, the twiddled average impulse response is zero padded to length N/K. At block 60, an N/K point FFT is performed to obtain the channel estimate for the N/K tones being estimated on the current burst. These are combined with the remaining tones, estimated on the previous bursts, to form the complete (all tones) channel estimate at block 61. In block 61, the notation $H_{-1}$ refers to the channel estimate at the previous burst. A more detailed description is found in Appendix A of the present application. This is described in application Ser. No. 10/001,986 (TI-32977) filed Oct. 31, 2001 entitled "A Computationally Efficient System and Method for Channel Estimation. This application is incorporated herein by reference.

Figure 5:
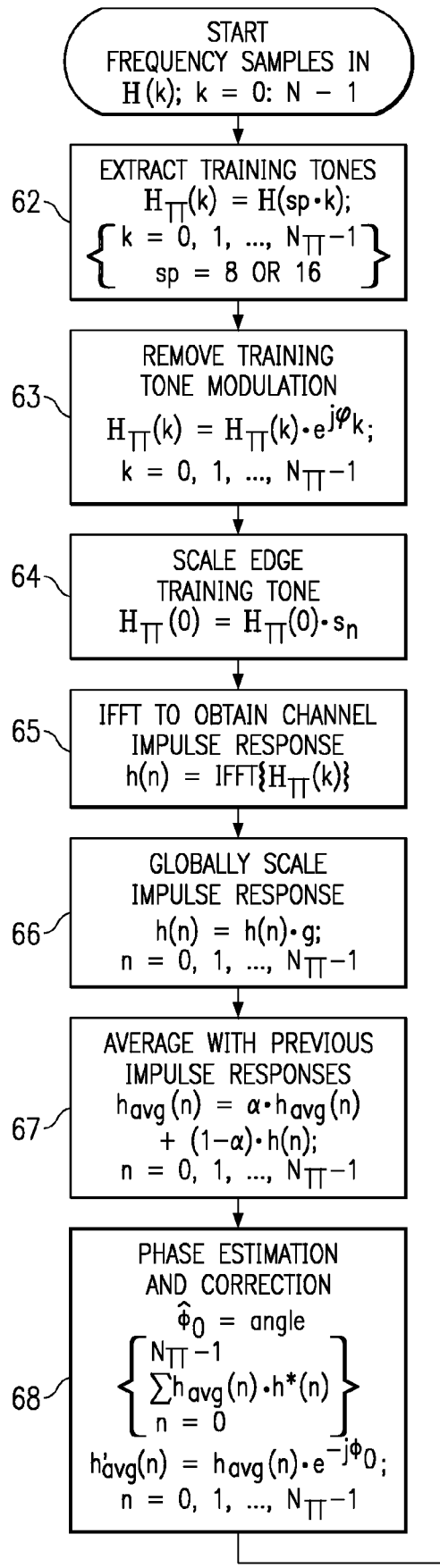
FIG. 5 illustrates the Texas instruments estimation method with impulse response averaging incorporating phase estimation and compensation.
Figure 5:
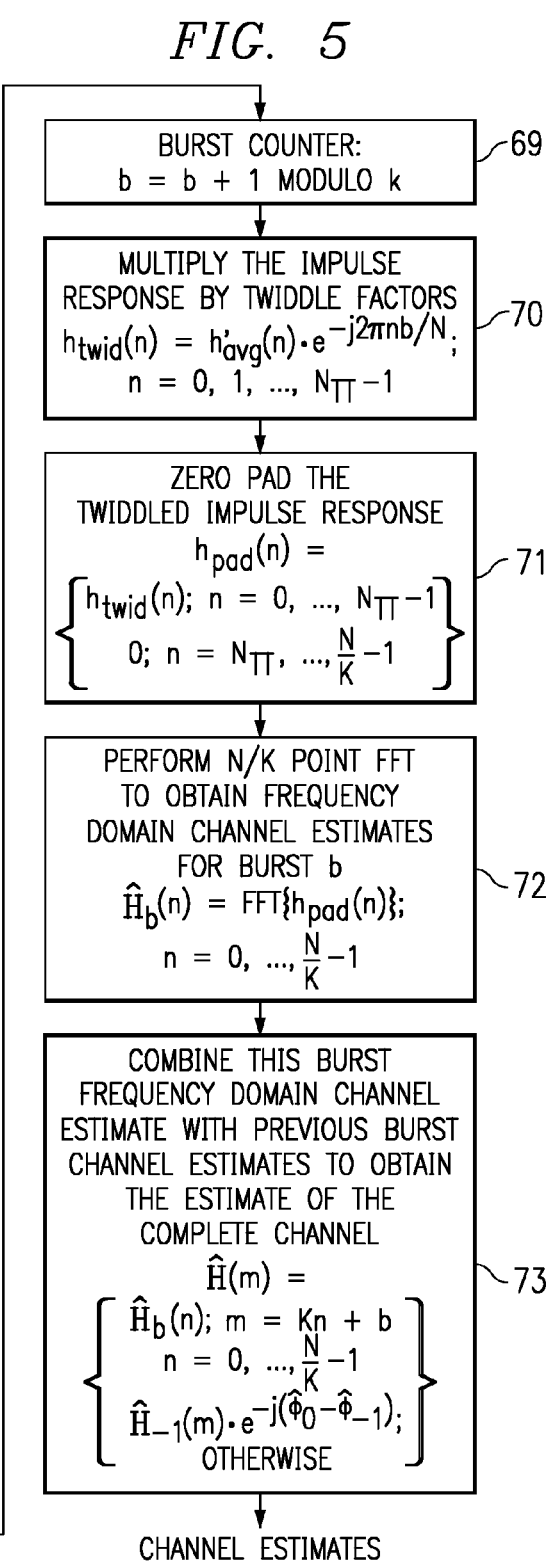

The impulse response averager at block 56 causes the same problem here that it caused in the standard BWIF channel estimation procedure. That is, it averages the common phase noise to near zero. FIG. 5 shows the modifications to FIG. 4 required to estimate and compensate for the phase shift induced by common phase noise. The blocks 62–67 remain the same as in FIG. 4. Block 68 is added to the output of block 67. Blocks 69–72 are like blocks 57–60 in FIG. 4. Block 73 is modified from block 61 in FIG. 4. The blocks that are added to or modified from FIG. 4 are in bold outline. The phase estimation and correction block 68 in FIG. 5 estimates the phase difference between the average impulse response and the current burst, then applies a phase correction to the average to bring it "into phase" with the current burst. The modified average is then used in block 70 (instead of the unmodified average). The result is that the channel estimates computed at block 71 are properly phased with respect to the common phase noise of the burst and the data.

Further modifications are required at block 73, where the current burst's estimates are combined with previous burst estimates to obtain the complete (all tones) estimate for the burst. The tones of the previous burst were phase aligned with the previous burst, not the current burst. Thus, a correction term on the previous burst's estimates is required to match the phase of the previous burst with that of the current burst. This is done by multiplying the previous burst tones with $e^{-j(\hat{\Phi}_0 - \hat{\Phi}_{-1})}$. Here, $\hat{\Phi}_0$ and $\hat{\Phi}_{-1}$ are the phase estimates at the current burst and previous burst, respectively.

3. Phase Noise Compensation for the TI Channel Estimation Procedure when Impulse Response Averaging is not Used There may be circumstances where it is advantageous to disable the impulse response averaging and compute channel estimates based on the impulse responses of a single burst. This poses a different scenario for phase estimation and compensation.

Figure 6:
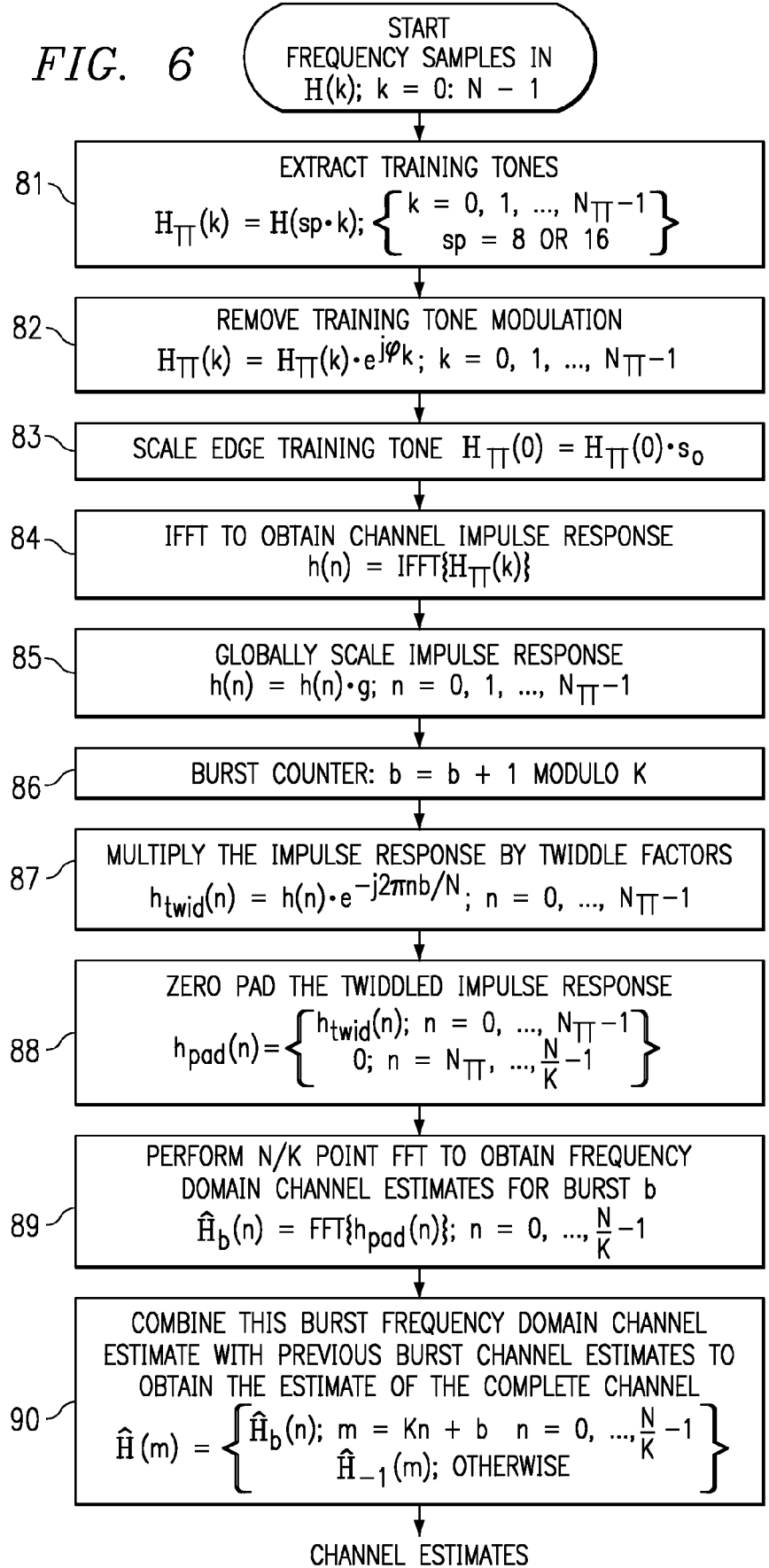
FIG. 6 illustrates the Texas Instruments Channel estimation routine without impulse response averaging.

FIG. 6 shows the TI channel estimation procedure without impulse response averaging. Steps 81 through 85 are identical to those of the BWIF standard procedure by blocks 31–35 shown in FIG. 2. However, instead of using the impulse response of step 85 to compute the channel estimates for all tones, the TI procedure uses the impulse response to compute the estimates for a fraction of the tones (N/K tones, where K is an integer power of 2). Since the impulse response is not averaged with previous impulse responses, it carries the phase shifts caused by common phase noise. Block 86 of the procedure increments a burst counter (modulo K) as previously. The index b is used in the computation of the twiddle factors in block 87 and in the indexing computations of block 90. At block 87, the impulse response is multiplied by twiddle factors $e^{-j2\pi n b/N}$. The result is zero padded to length N/K in block 88. At block 89, an N/K point FFT is performed to obtain the channel estimates at the N/K frequencies. This is combined with estimates of the other frequencies (estimated at previous bursts) in block 90.

The channel estimates obtained at block 89 are all uniformly shifted by the phase shift induced by common phase noise. However, the tones estimated at previous bursts and used in block 90 have a different phase shift. So, the estimate obtained at the output of block 90 will have an incorrect phase shift on (K--1)*N/K frequencies.

Figure 7:
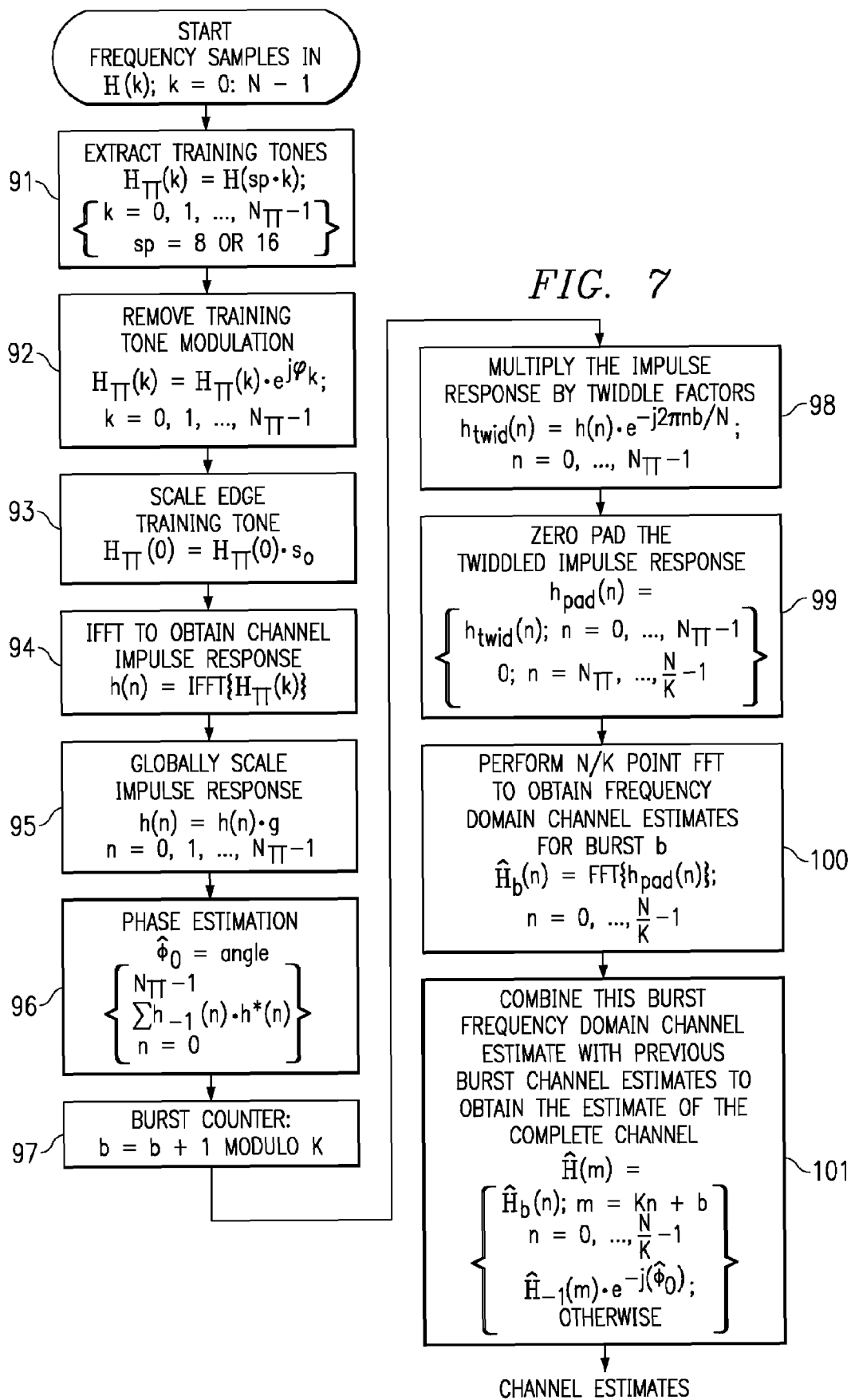
FIG. 7 illustrates the Texas Instruments Channel Estimation procedure (without impulse response averaging) incorporating phase estimation and compensation.

To correct this, the processing is altered as shown in FIG. 7. The processing in blocks 91–95 is like that in blocks 81–85 in FIG. 6. Blocks 97–100 are like blocks 86–89 in FIG. 6. At block 96 a phase estimation estimates the difference in phase between the present burst and the previous burst. This is computed as $$\hat{\Phi}_0 = \text{angle}\left\{\sum_{n=0}^{N_{TT}-1} h_{-1}(n) \cdot h^*(n)\right\} \quad (3)$$

where $h_{-1}(n)$ are the samples of the previous burst's impulse response.

The angle $\hat{\Phi}_0$ is the estimated phase difference. This is used in block 101 to correct the tones from the previous estimate $\hat{H}_{-1}$, where the subscript (−1) indicates the previous burst. Thus, all the tones in the total estimate $\hat{H}$ have the same phase with respect to phase noise.

4. An Alternative Implementation for the BWIF Standard Including an Alternative Implementation of Phase Noise Estimation and Compensation.

Figure 8:
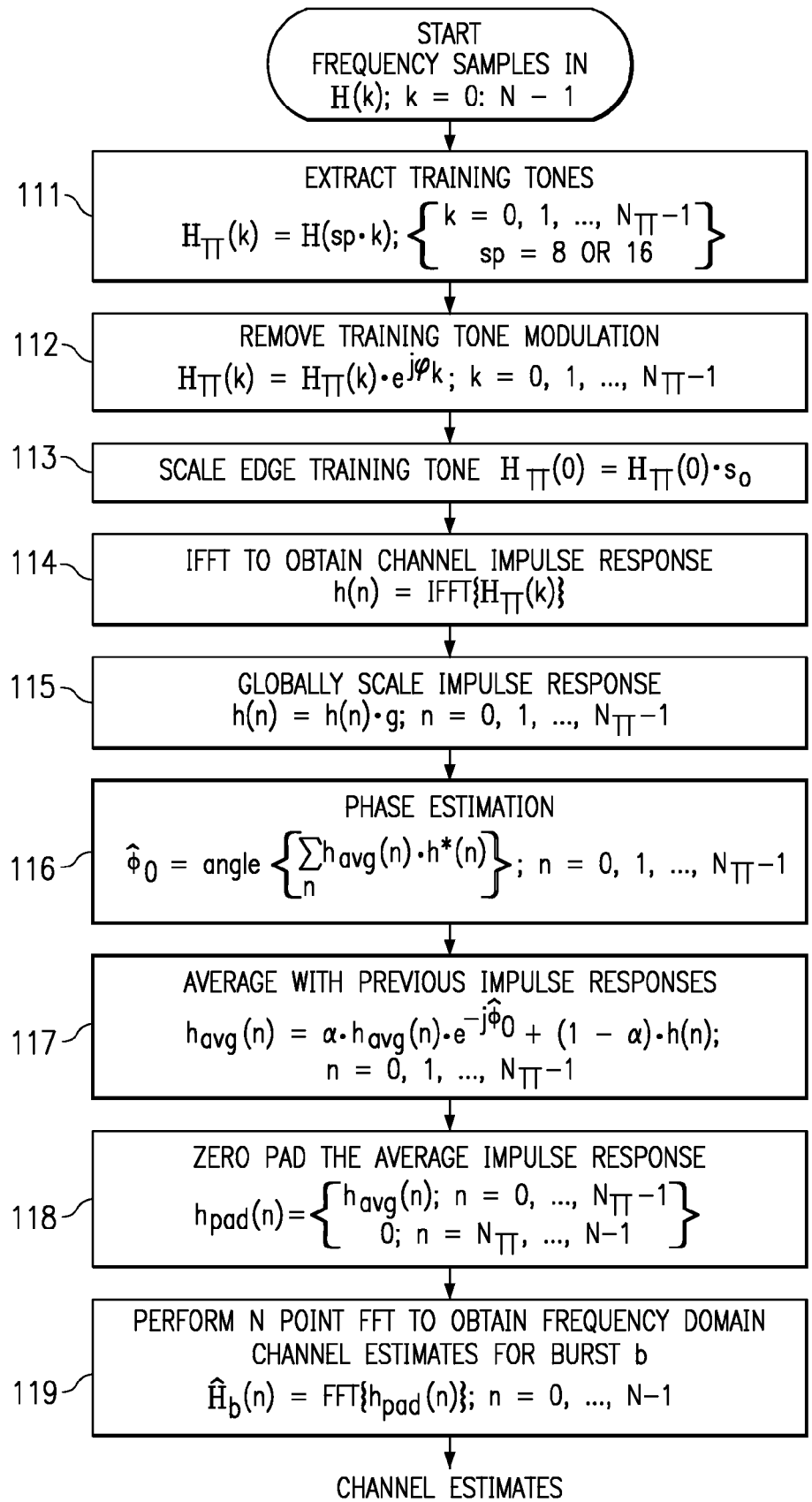
FIG. 8 illustrates the standard BWIF channel estimation procedure incorporating an alternate implementation of phase noise estimation and compensation.
Figure 9:
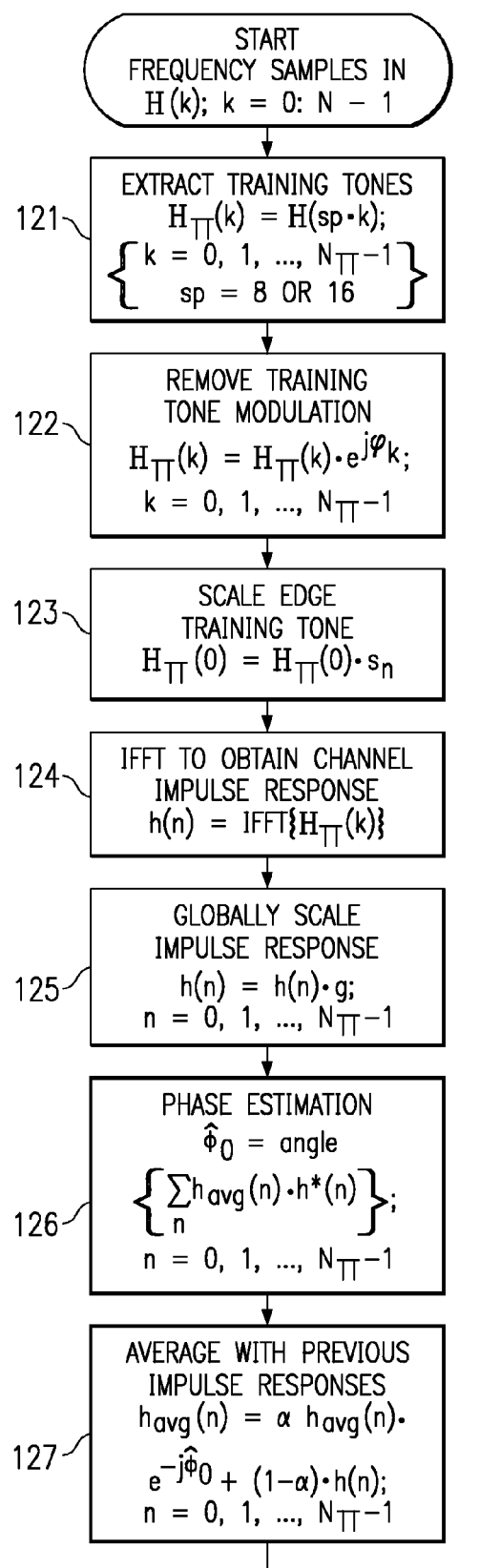
FIG. 9 illustrates the Texas Instruments channel estimation method with impulse response averaging incorporating the alternate phase estimation and compensation.
Figure 9:
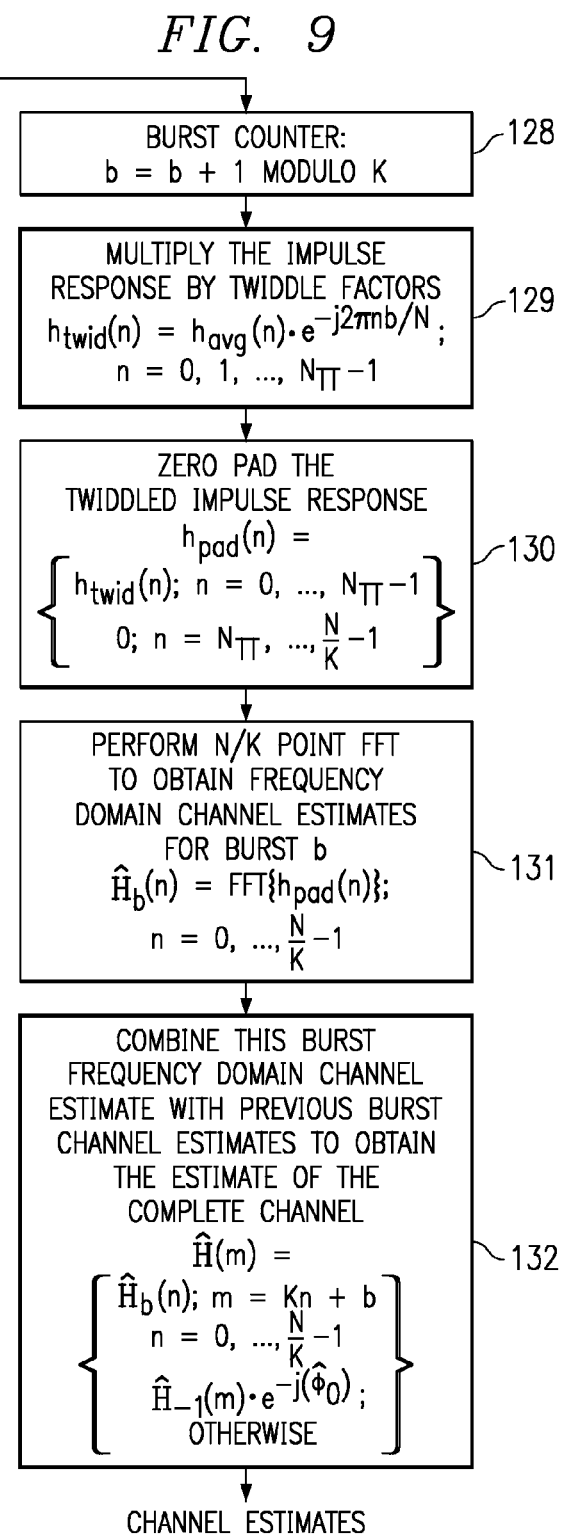

Referring to FIGS. 8 and 9 there is an alternative procedure for compensating for phase noise. The alternative implementation is shown in FIG. 8 for the BWIF standard processing and is shown in FIG. 9 for the TI channel estimation procedure with impulse response averaging. Blocks 111–115 and 118 and 119 in FIG. 8 is the same as the standard BWIF blocks 31–35 and blocks 36–38 in FIG. 2 The idea behind the alternative phase compensation procedure is to estimate the phase angle $\hat{\Phi}_0$ based on the value of $h_{avg}$ (block 116) before it is updated with the current impulse response. Then, when the average is updated, the old average is phase corrected by multiplication by $e^{-j\hat{\Phi}_0}$ to "phase align" it with the current impulse response. This is shown in block 117 of FIG. 7. With this alternative approach, the average impulse response is phase aligned with current impulse response measurement.

5. The TI Channel Estimation Method with Impulse Response Averaging Incorporating the Alternate Phase Estimation and Compensation FIG. 9 illustrates a similar modification to the TI channel estimation method as described in FIG. 4. Blocks 121–125 correspond to blocks 51–55 in FIG. 4 and blocks 128–132 correspond to blocks 57–61 in FIG. 4. Block 126 estimates the phase angle $\Phi_0$ based on the value of $h_{avg}$. The old average is phase corrected by multiplication by $e^{-j\hat{\Phi}_0}$ to "phase align" it with the current impulse response. This is shown in block 127 of FIG. 9.

Although preferred embodiments have been described, it will be apparent to those skilled in the relevant art that various modifications, additions, substitutions and the like can be made without departing from the spirit and of the invention and these are therefore considered to be within the scope of the invention as defined in the following claims.

The invention claimed is:

1. A method of channel estimation comprising the steps of:
   extracting training tones from a received digitized data burst;
   determining a channel impulse response based on the extracted tones;
   averaging the impulse response with previous impulse responses;
   estimating the difference in phase between the current impulse response and the average impulse response;
   correcting the average impulse response to phase align it with the current impulse response; and
   performing a Fast Fourier Transform on the average impulse response to provide a channel estimate.

2. The method of claim 1 including the step of zero padding the impulse response or tones and performing a Fast Fourier Transform on the zero padded average impulse response to provide a channel estimate.

3. A method of channel estimation comprising the steps of:
   extracting training tones from a received digitized data burst;
   determining a channel impulse response based on the extracted tones;
   averaging the impulse response with previous impulse responses;
   estimating the difference in phase between the current impulse response and the average impulse response;
   correcting the average impulse response to phase align it with the current impulse response;
   frequency shifting the spectrum of the channel impulse response;
   performing a Fast Fourier Transform on the frequency shifted channel impulse response to provide a partial channel estimate; and
   combining the partial channel estimate with at least one other partial channel estimate to form an aggregated channel estimate.

4. The method of claim 3 including the step of zero padding the impulse response and performing a Fast Fourier Transform on the zero padded frequency shifted channel impulse response to provide a partial channel estimate.

5. A method of channel estimation comprising the steps of:
   extracting training tones from a received digitized data burst;
   determining a channel impulse response based on the extracted tones;
   averaging the impulse response with previous impulse responses;
   estimating the difference in phase between the current impulse response and the average impulse response;
   correcting the average impulse response to phase align it with the current impulse response;
   frequency shifting the spectrum of the channel impulse response;
   performing a Fast Fourier Transform on the frequency shifted channel impulse response to provide a partial channel estimate;
   phase correcting at least one previous partial channel estimate; and
   combining the partial channel estimate with at least one other previous phase corrected partial channel estimate to form an aggregated channel estimate.

6. The method of claim 5 including the step of zero padding the impulse response and performing a Fast Fourier Transform on the zero padded frequency shifted channel impulse response to provide a partial channel estimate.

7. A method of channel estimation comprising the steps of:
   extracting training tones from a received digitized data burst;
   determining a channel impulse response based on the extracted tones;
   estimating the difference in phase between the current burst impulse response and previous burst imrulse response;
   frequency shifting the spectrum of the channel impulse response;
   performing a Fast Fourier Transform on the frequency shifted channel impulse response to provide a partial channel estimate; and
   combining the partial channel estimate with at least one other partial channel estimate to form an aggregated channel estimate.

8. The method of claim 7 including the step of zero padding before performing a Fast Fourier Transform on the zero padded frequency shifted channel impulse response to provide a partial channel estimate.

9. A method of channel estimation comprising the steps of:
   extracting training tones from a received digitized data burst;
   determining a channel impulse response based on the extracted tones;
   estimating the difference in phase between the current burst impulse response and the previous burst imrulse response;
   frequency shifting the spectrum of the channel impulse response;
   performing a Fast Fourier Transform on the frequency shifted channel impulse response to provide a partial channel estimate;
   phase correcting at least one previous partial channel estimate; and
   combining the present partial channel estimate with at least one previous, phase corrected, partial channel estimate.

10. The method of claim 9 including the step of zero padding the tones and performing a Fast Fourier Transform on the zero padded tones to provide a partial channel estimate.

11. A method of channel estimation comprising the steps of:
    extracting training tones from a received digitized data burst;
    estimating phase shift caused by common phase noise before the average impulse response is updated with the current impulse response;
    averaging the current impulse response with the previous impulse response whereby the old average is updated by $e^{-j\Phi_0}$ to phase align it with the current impulse response;
    performing a Fast Fourier Transform on the average impulse response to provide a channel estimate.

12. The method of claim 11 including the step of zero padding the averaged impulse response before performing a Fast Fourier Transform on the zero padded averaged impulse response to provide a channel estimate.

13. A method of channel estimation comprising the steps of:
   extracting training tones from a received digitized data burst;
   determining a channel impulse response based on the extracted tones;
   estimating the phase angle based on the value of average imrulse response before it is updated with the current impulse response;
   averaging the current impulse response with the previous impulse response whereby the old average is phase corrected by multiplication by $e^{-j\Phi_0}$ to phase align it with the current impulse response;
   frequency shifting the spectrum of the channel impulse response;
   performing a Fast Fourier Transform on the frequency shifted channel impulse response to provide a partial channel estimate;
   phase correcting at least one other previous partial channel estimate; and
   combining the partial channel estimate with at least one other partial previous phase corrected channel estimate to form an aggregated channel estimate.

14. The method of claim 13 including the step of zero padding before performing a Fast Fourier Transform on the zero padded frequency shifted channel impulse response to provide a partial channel estimate.

* * * * *